No. 712,089. Patented Oct. 28, 1902.
R. F. PIATT.
STEAM TRAP.
(Application filed Mar. 19, 1902.)
(No Model.)

Attest
Inventor
Richard F. Piatt

UNITED STATES PATENT OFFICE.

RICHARD F. PIATT, OF LOUISVILLE, KENTUCKY, ASSIGNOR TO JOSEPH McWILLIAMS AND COMPANY, A CORPORATION OF KENTUCKY.

STEAM-TRAP.

SPECIFICATION forming part of Letters Patent No. 712,089, dated October 28, 1902.

Application filed March 19, 1902. Serial No. 98,919. (No model.)

*To all whom it may concern:*

Be it known that I, RICHARD F. PIATT, of the city of Louisville, county of Jefferson, and State of Kentucky, have invented an Improvement in Steam-Trap Apparatus, of which the following is a specification.

My improved steam-trap apparatus is particularly designed for use in connection with a vacuum system, or one in which a lower pressure or partial vacuum is maintained on the outlet side by means of suitable exhausting or vacuum-creating devices; and its objects are to enable the air to be freely discharged through the trap, to prevent the escape of steam, and to enable the water to be discharged when it accumulates beyond a certain quantity.

The trap consists of a body having its outlet located at a substantial distance above the bottom and its inlet communicating with the bottom or lower portion of the trap at a substantial distance below the outlet through a passage-way of relatively small area, so that the body of the trap will become filled with water of condensation up to the level of the outlet, and the inlet-opening will lead into the body of the trap below the water seal formed by this body of water. Connected with the outlet is an exhauster or vacuum-creating device by which a suction, partial vacuum, or lower pressure is maintained in the outlet, so that air will be drawn through the body of water to the outlet and into the return, while any steam that enters the trap will be condensed in the body of water maintained therein. The water of condensation will be discharged as the accumulation raises the level above the outlet. To prevent material ebullition or agitation of the water in the trap by the entry of steam, which would tend to force out a portion of the water, and thus lower its level, baffles, preferably in the form of perforated diaphragms, may be arranged in the body of the trap.

Figure 2:
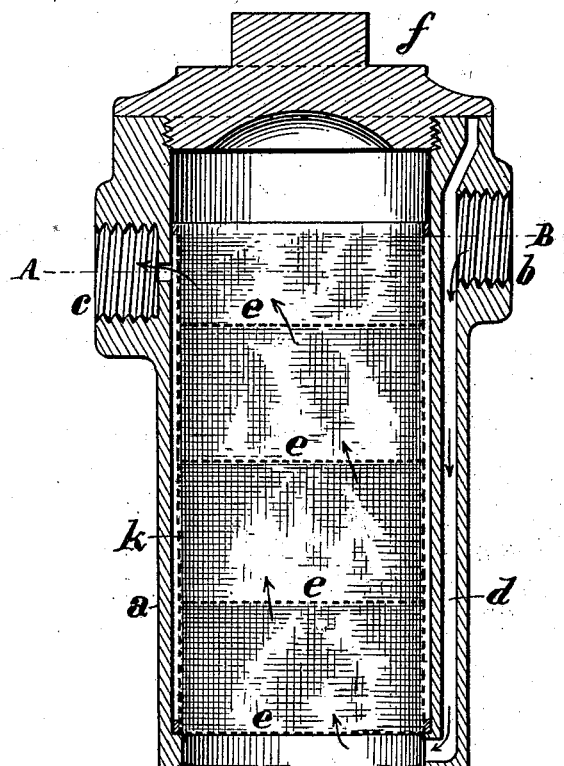
Figure 1:
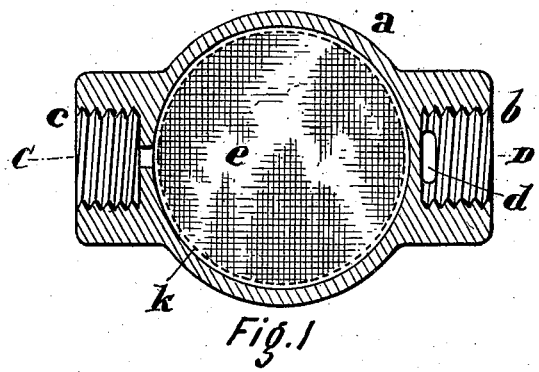

In the drawings, Figure 1 is a horizontal sectional view of a steam-trap embodying my invention, taken on the line A B of Fig. 1. Fig. 2 is a vertical sectional view of the same on line C D of Fig. 1, and Fig. 3 is a diagram showing the application of my trap to a steam-radiator.

The body of the trap is provided with an inlet $b$, connected with the radiator or apparatus to be drained and with an outlet $c$, connected with the return, in which a partial vacuum or lower pressure is maintained by suitable exhausting devices. As shown, the body of the trap is more or less elongated and the outlet $c$ is located near the top or at a substantial distance from the bottom. The inlet $b$ communicates with the body of the trap near the bottom. Preferably the inlet connection is located at the upper part of the trap and communicates with the base through a relatively small passage-way $d$ in the walls of the trap. The open end of the body of the trap may be closed by a removable cap or cover $f$.

When the trap is empty, a free thoroughfare for air and steam is afforded through the inlet $b$, passage-way $d$, and outlet $c$. The water of condensation, which enters the trap through the inlet $b$ and passage-way $d$, is trapped in the base of the body, and as the opening of the passage-way $d$ is near the base as soon as any substantial quantity of water accumulates it will seal the passage-way $d$. As the water continues to accumulate it will rise in the body of the trap until it reaches the outlet $c$, when the excess will flow out into the return-line. Any air that reaches the inlet $b$ will be drawn through the water by the partial vacuum in the return-line, and such steam as is drawn through the inlet by the partial vacuum will immediately be condensed in the water and will be discharged as water of condensation. As the passage-way $d$ is of smaller cross-section than the body of the trap, the air will be drawn through the body of water in the trap without discharging the water through the outlet $c$ until its level passes the outlet. The trap will therefore effectively prevent the passage of steam into the return and will permit the discharge of the air and water. Normally the water-level will be maintained in the trap just at the outlet $c$. As the entry of steam into the body of the water will tend to produce more or less ebullition and agitation, which would cause some water to pass out of the outlet $c$, and thus lower the water-level in the trap, I place one or more baffles $e$ in the trap to subdue this agitation. These baffles are preferably perforated diaphragms arranged at intervals in the cylinder *f*, inserted in the body of the trap. The cylinder and diaphragms may be most conveniently formed of wire-cloth.

Figure 3:
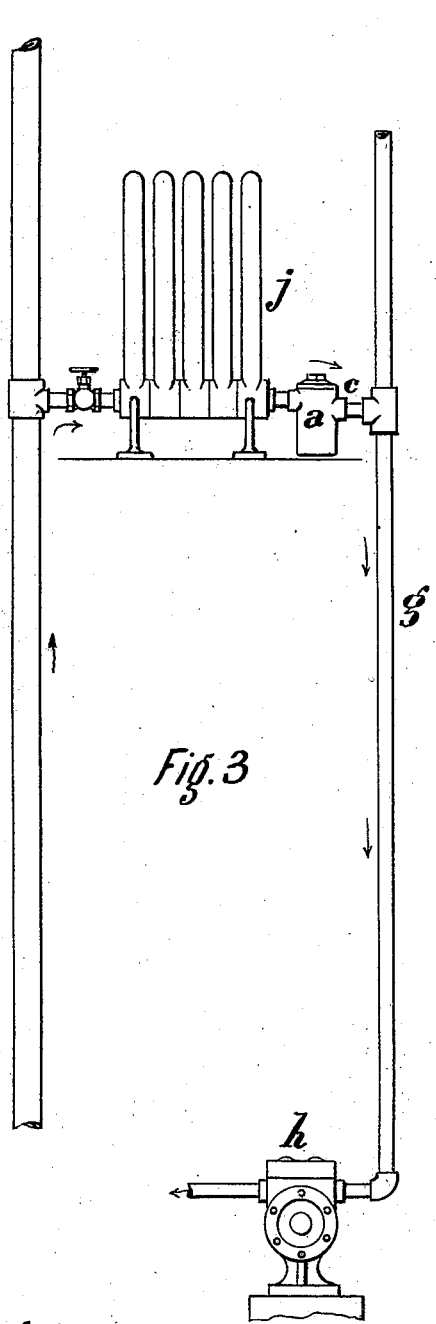

In Fig. 3 the trap is shown connected with the outlet of a radiator *j*, with the return *g* from the trap-outlet *c* leading to the pump or exhauster *h*. I have shown but a single radiator provided with the trap; but in practice each radiator may be provided with the trap, or a single trap may be used with a return from a series of radiators, or one large trap may be used for the whole system.

The essential feature of the invention resides in the combination, with the trap, of means to create a partial vacuum in the outlet, so that the air may be drawn through the water seal without discharging the water until it accumulates to a sufficient extent to pass out of the outlet; and I do not therefore limit myself to the details of construction shown, as they may be varied without departing from the essentials of the invention.

What I claim as new, and desire to secure by Letters Patent, is as follows:

1. A steam-trap, consisting of a body having an outlet located at a distance above the bottom of the body and an inlet communicating with the body near the bottom at a substantial distance below the outlet, whereby the inlet leads into the body below a water seal formed by the accumulation of water of condensation, and means to create a partial vacuum or lower pressure at the outlet to draw air from the inlet through the body of water in the trap.

2. A steam-trap, consisting of a body having an outlet located at a distance above the bottom of the body and an inlet communicating with the body through a relatively small passage-way opening into the body near the bottom at a substantial distance below the outlet, whereby the inlet leads into the body below the water seal formed by the accumulation of water of condensation, and means to create a partial vacuum or lower pressure at the outlet to draw air from the inlet through the body of water in the trap.

3. A steam-trap, consisting of an elongated body having an outlet-opening near the top, a passage-way of relatively small cross-sectional area leading from the bottom of the body to the upper portion, and an inlet near the top communicating with said passage-way, in combination with means to create a partial vacuum or lower pressure in said outlet.

4. A steam-trap, consisting of a body having an outlet located at a distance above the bottom of the body and an inlet communicating with the body near the bottom at a substantial distance below the outlet, whereby the inlet leads into the body below a water seal formed by the accumulation of water of condensation, a perforated baffle arranged transversely in said body between the outlet and inlet openings, and means to create a partial vacuum or lower pressure in the outlet.

5. A steam-trap consisting of a body having an outlet in which a partial vacuum or lower pressure is created located at a distance above the bottom of the body, and an inlet communicating with the body near the bottom at a substantial distance below the outlet and a series of perforated baffles arranged transversely in said body between the outlet and inlet opening.

6. A steam-trap consisting of a body having an outlet in which a partial vacuum or lower pressure is created located at a distance above the bottom of the body, and an inlet communicating with the body near the bottom at a substantial distance below the outlet and a removable cylinder fitting within said body and provided with perforated baffles between the outlet and inlet opening.

In testimony of which invention I have hereunto set my hand.

RICHARD F. PIATT.

Witnesses:
P. H. SAVAGE,
H. C. KINNISON.